United States Patent [19]
Beckmann et al.

[11] Patent Number: 5,717,022
[45] Date of Patent: Feb. 10, 1998

[54] RUBBER COMPOSITION, PARTICULARLY FOR TIRE TREAD

[75] Inventors: Otto Beckmann, Traiskirchen, Austria; Joachim Bertrand; Reinhard Teves, both of Seelze, Germany

[73] Assignee: Semperit Reifen AG, Traiskirchen, Austria

[21] Appl. No.: 708,962

[22] Filed: Sep. 6, 1996

[30] Foreign Application Priority Data

Sep. 7, 1995 [AT] Austria ................................. 1482/95

[51] Int. Cl.$^6$ ......................................... C08K 3/00
[52] U.S. Cl. ..................... 524/493; 524/386; 524/387; 524/388; 524/492; 524/495
[58] Field of Search ........................... 524/495, 492, 524/493, 386, 387, 388

[56] References Cited

U.S. PATENT DOCUMENTS

| | | |
|---|---|---|
| 2,059,448 | 11/1936 | Epstein et al. |
| 2,760,632 | 8/1956 | Hillyer. |
| 3,445,189 | 5/1969 | Maat et al. ............................. 23/182 |

FOREIGN PATENT DOCUMENTS

| | | |
|---|---|---|
| 0314271 | 5/1989 | European Pat. Off. |
| 0447066 | 9/1991 | European Pat. Off. |
| 0501227 | 9/1992 | European Pat. Off. |
| 01110999 | 4/1989 | Japan. |

OTHER PUBLICATIONS

Dunnom, "Use of Reinforcing Silicas", Rubber Age (Aug. 1968).

Dannenberg, "Effects of Surface Chemical Interactions on Properties of Filler Reinforced Rubber", Rubber Chemistry & Tech., 1975.

Dannenberg, "The Effects of Surface Chemical Interactions on the Properties of Filler–Reinforced Rubbers", *Rubber Chemistry and Technology*, vol. 41/3, pp. 410–461 (1975).

Dunnom, "Use of Reinforcing Silicas", *Rubber Age*, pp. 49–57, May 1968.

Wagner, "Reinforcing Silicas and Silicates", *Rubber Chemistry and Technology*, vol. 49/3, pp. 703–774 (1976).

Chemical Abstracts, vol. 111, No. 20, Abstract No. 176436, published Nov. 13, 1989.

A European Search Report.

Australian Examination Report.

*Primary Examiner*—Edward J. Cain
*Attorney, Agent, or Firm*—Greenblum & Bernstein, P.L.C.

[57] ABSTRACT

A rubber mixture, in particular for the tread of a tire, based on at least one polymer that is from the group of diene rubbers and respectively contains 5 to 100 parts by weight finely distributed, precipitated silicic acid, 0 to 80 parts by weight carbon black, if need be 0.2 to 10 parts by weight silane coupling agent, and 0.5 to 20 parts by weight of at least one non-aromatic, viscosity-reducing substance with regard to 100 parts by weight rubber. The viscosity-reducing, non-aromatic substance is based exclusively on the elements carbon, hydrogen, and oxygen and has a region with at least two hydroxyl groups that exist in the form of 1,2-diol or 1,3-diol, and a region of at least two chemically bonded carbon atoms, wherein neither the chemically bonded carbon atoms nor their chemically bonded neighboring carbon atoms are substituted with oxygen.

32 Claims, No Drawings

RUBBER COMPOSITION, PARTICULARLY FOR TIRE TREAD

CROSS-REFERENCE OF RELATED APPLICATIONS

The present invention claims the priority under 35 U.S.C. §119 of Austrian Patent Application No. 1482/95 filed Sep. 7, 1995, the disclosure of which is expressly incorporated by reference herein in its entirety.

BACKGROUND OF THE INVENTION

The current invention relates to a rubber composition (mixture), particularly for the tread of a tire, based on at least one polymer that is from the group of diene rubbers and respectively contains 5 to 100 parts by weight finely distributed, precipitated silicic acid, 0 to 80 parts by weight carbon black, if need be 0.2 to 10 parts by weight silane coupling agent and 0.5 to 20 parts by weight of at least one non-aromatic, viscosity-reducing substance with regard to 100 parts by weight rubber.

In order to reduce the rolling resistance and improve other tire properties, such as wet traction or friction wear, currently it is relatively widespread to use rubber mixtures for tire tread that contain styrene-butadiene rubber produced in solution, most often in combination with at least one other diene elastomer and finely distributed, precipitated silicic acid as a reinforcing filler. The silicic acid is used either alone or in combination with carbon black. Rubber mixtures of this kind for tire tread are known for example from EP-A 0 501 227 or EP-A 0 447 066.

With the use of precipitated silicic acid in lieu of activated carbon black in rubber mixtures based on standard polymers, such as natural rubber, isoprene rubber, butadiene rubber, or styrene-butadiene rubber, a sharply increased viscosity of the unvulcanized mixture is observed. The increased viscosity is attributed to the build-up of a silicic acid network in which the primary particles embody hydrogen bridges among themselves by means of the silanol groups present on its surface.

A series of measures is already known and also customary for the purpose of reducing the high viscosity that interferes with processing. In this connection, please refer for example to the publications "Reinforcing Silicas and Silicates" in "Rubber Chemistry and Technology", 49/3, pp. 703 to 774 (1976) by M. P. Wagner or to "The Effects of Surface Chemical Interaction on the Properties of Filler-Reinforced Rubbers" in "Rubber Chemistry and Technology", 48/3, pp. 410 to 461 (1975) by E. N. Dannenberg. In these publications, the use of metallic soaps, primarily zinc soaps, is proposed or mentioned, which soaps additionally improve the formability of the mixture as well as the use of diverse coupling agents, primarily silanes. The viscosity-reducing effect of polyols, glycerine, and diethylene glycol is also known. An investigation of the effect of different polyols in SBR—silicic acid mixtures is contained for example in "Rubber Age", May 1968, pp. 49 to 57, by D. D. Dunnom. The greatest reduction of the mixture viscosity was detected with an addition of 2-methyl, 2,4-pentanediol, or 2,2,4-trimethyl-1,3-pentanediol. These two diols, though, should not be used in rubber mixtures since they drastically reduce cross-linking yield. The viscosity-reducing effect of amines, for example triethanolamine, and some accelerators, for example sulfenamides is also known.

The viscosity-reducing effect of these different substances could be attributed to their adsorption on the salicic acid surface by virtue of the fact that they weaken the interaction between the primary particles.

With the wide introduction of so-called full silica mixtures in treads of car tires, the problem of high mixture viscosities became relevant once more. Extremely high mixture viscosities paired with poor mixture processing occur particularly in full silica mixtures with relatively low silane content or a low content of zinc soaps.

SUMMARY OF THE INVENTION

The object of the current invention is to discover more efficient viscosity-reducing substances for silica mixtures, which substances should also improve mixture processing distinctly. This object should furthermore be attained with toxicologically harmless substances that do not have negative effects on the desirability of the vulcanized mixture.

The stated object is attained according to the invention by virtue of the fact that the viscosity-reducing, non-aromatic substance is based exclusively on the elements carbon, hydrogen, & oxygen and has a region with at least two hydroxyl groups that exist in the form of 1,2-diol or 1,3-diol, and has a region of at least two chemically bonded carbon atoms, wherein neither these nor their chemically bonded neighboring carbon atoms are substituted with oxygen.

It has turned out that the use of substances of this kind in salicic acid-containing rubber mixtures produces a viscosity reduction of the mixture that is higher than achieved when known viscosity-reducing materials are used, wherein it is simultaneously assured that the rubber mixture can be processed in a very favorable manner. Furthermore, the substances proposed within the scope of the invention are toxicologically harmless and their use assures the other desired properties of the vulcanized material produced from the rubber mixture according to the invention.

The percentage of viscosity-reducing substance added to the rubber mixture according to the invention should be between 1 and 10 parts by weight, with regard to 100 parts by weight rubber in the mixture. The best results were achieved within this quantity range.

DESCRIPTION OF THE PREFERRED EMBODIMENTS

In a preferred embodiment of the invention, the oxygen atoms of the added viscosity-reducing substance exist exclusively in hydroxyl groups.

From the group of these substances, 1,2-pentanediol, 2-methyl-2-propyl-1,3-propanediol, 2-butyl-2-ethyl-1,3-propanediol, 2-sec-butyl-2-methyl-1,3-propanediol, and tri-methylolpropane (2-ethyl-2-hydroxymethyl-1,3-propanediol) are particularly worth considering. The addition of trimethylolpropane has proven to be particularly advantageous with regard to viscosity-reducing effects and the ability to be processed.

In another preferred embodiment of the invention, in addition to the hydroxyl groups, the added viscosity-reducing substance has other oxygen functional groups such as ester, ether, acetal, or ketal functional groups.

In particular, substances of this kind can preferably be used in which these additional oxygen functional groups form a bridge between one region with at least 2 hydroxyl groups that exist in the form of 1,2-diol or 1,3-diol and a region with at least two chemically bonded carbon atoms, wherein neither these nor their chemically bonded neighboring carbon atoms are substituted with oxygen.

In these viscosity-reducing substances with "bridge oxygen", esters of polyols with fatty acids represent an important group, wherein the polyols are preferably converted only once with fatty acid (monoester). In contrast, Diesters have a relatively weak viscosity-reducing effect.

Therefore primarily glycerine, trimethylolpropane, pentaerythrite, a sugar alcohol such as erythrite, xylite, sorbite, dulcite, mannite, or inosite and also low-molecular vinyl alcohol with a molecular weight <600 g/mol are considered to be polyols.

In lieu of simple polyols, polyols that contain one or more ether groups can also be components of esters according to the invention. Of this group, primarily the poly-compounds of glycerine or pentaerythrite, in particular the di-compounds (diglycerine, dipentaerythrite), as well as the cyclical ethers that can be produced by the removal of water from sugar alcohols, in particular the sorbitanes derived from sorbite, as well as the group of polyols that have a moderate ethoxylation, and furthermore the group of sugars present in the furan or pyran configuration, in particular saccharose can be favorably used.

According to another feature of the invention, viscosity-reducing substances can be used according to the invention and have a region with at least two hydroxyl groups that is esterified with one or two fatty acid molecules via bridge oxygens. In the process, the following in particular are worth considering as acids: octane acid, 2-ethylhexane acid, lauric, stearic, palmitic, oleic, linoleic, linolenic, and ricinoleic acid, as well as fatty acids with alicyclic side chains, in particular cyclopentenyl fatty acids.

Those substances whose fatty acid component is a mixture of fatty acids are well suited in this context. Mixtures that are based on natural raw materials and are produced in the splitting of fatty acids are particularly suitable in this connection, for example coconut, rapeseed, and soya oil acids, as well as their fractions, e.g. the low-molecular weight first-run acids. However, other technical mixtures that are predominantly comprised of fatty acids can be used here, for example tall oil fatty acids.

In particular, the compounds of sugar and fatty alcohols are significant as viscosity-reducing substances that are used within the scope of the invention and have one oxygen atom in an "ether bridge".

Finally, according to another embodiment of the invention, non-aromatic substances can be used, in which the polyols are partially acetalized with an aldehyde. For example, one of these is low-molecular weight polyvinyl alcohol that is converted with butyral to approximately 30%.

The current invention also relates to tires whose tread is comprised at least in part of the vulcanized rubber mixture according to the invention.

The invention will now be described in detail in conjunction with several exemplary embodiments, one standard example and two comparison examples, which are summed up in the attached Table 1.

In all the mixture examples contained in Table 1, the numerical values indicated are parts by weight, which are in reference to 100 parts by weight rubber in the mixture.

All mixture recipes agree with regard to the polymer waste, proportions of carbon black, salicic acid, silane, aromatic oil, zinc soap, fatty acid soap, stearic acid, zinc white, anti-oxidant agent, light protection wax, accelerator (DPG, CBS), and sulfur. Different viscosity-reducing substances were added to the mixtures, each in a proportion of 2 parts by weight, the standard example being a conventional processing aid.

The polymer waste in all mixture recipes was comprised of natural rubber, styrene-butadiene rubber (S-SBR) and cis-butadiene rubber (cis-BR) produced in solution. The rubber component, though, can be chosen from other than these, but contains at least one polymer from the group that includes natural rubber, polyisoprene rubber, cis-butadiene rubber or vinyl polybutadiene rubber, styrene-butadiene rubber (produced in emulsion or in solution), or mixtures of these, wherein additional admixtures of butyl rubber, halobutyl rubber, or 3,4-isoprene rubber are possible.

In relation to the salicic acid content, fundamentally every finely distributed, precipitated salicic acid that is usually used in the production of rubber mixtures can be used within the scope of the invention. In particular, these salicic acids are used as fillers and have a BET surface of 40 to 350 $m^2/g$, in particular 100 to 250 $m^2/g$, a CTAB surface of 50 to 350 $m^2/g$, preferably 100 to 250 $m^2/g$, an average particle diameter of 10 to 150 μm, preferably 10 to 100 μm, and a DBP absorption of 50 to 350 ml per 100 g, preferably 150 to 250 ml per 100 g.

The salicic acid is preferably used together with a silane coupling agent, wherein primarily sulfur-containing silanes are suitable, possibly silanes for example, which are selected from bis (3-triethylsilylpropyl)—tetrasulfide (TESPT, with carbon black mixed in a ratio of 1 to 1, which is available on the market as the commercial product X50S, from the Degussa company), 3-mercaptopropyl triethoxysilane and 3-thiocyanatopropyl trymethoxsilane.

The silane coupling agent is used in a quantity of 0.2 to 10 parts by weight, preferably 0.5 to 7 parts by weight. A rubber mixture according to the invention can contain carbon black but does not have to. Commercially available carbon blacks that are known to one skilled in the art and are customarily used in rubber mixtures for tread are suitable for this. The carbon black content in particular is 10 to 20 parts by weight, preferably up to 70 parts by weight.

The rubber mixture also contains the conventional mixture components already mentioned above, in parts by weight customary for tread mixtures.

Laboratory samples were taken from all the mixture recipes and a few laboratory tests were carried out. The testing procedures below were used:

Mooney viscosity (ML 1+3, 100° C.): according to DIN 53523, part 3.

Breaking strength, deformation at break, and stress value at 100% and 300% stretch: according to DIN 53504.

Shore hardness A: according to DIN 53505, respectively at room temperature (RT), at −10° C., and at 70° C.

Rebound resilience: according to DIN 53512, respectively at room temperature (RT) and at 70° C.

Impact value: according to DIN 53515, respectively at 70° C.

Permanent set (compression set B): according to DIN 53517, respectively at 70° C.

The standard mixture contained pentaerythrite tristearate as a processing aid, the comparison mixtures $V_1$ and $V_2$ contained known viscosity-reducing substances, polyethylene glycol 1500 and glycerine respectively. According to the invention, the rubber mixtures E1 and E4 contained non-aromatic, viscosity-reducing substances.

The perceptibly reduced viscosity of the mixtures E1 to E4 according to the invention is evident from the determined values for Mooney viscosity after the preparation of the raw rubber mixtures. It was determined that all mixtures produced according to the invention were generally improved considerably in relation to the standard mixtures and the two comparison mixtures, in their ability to be mixed and also in their ability to be processed, in particular the ability to be sprayed.

Through the execution of further laboratory tests of completely vulcanized specimens, it was determined that the vulcanized materials produced from mixture recipes E1, E2, and E3 demonstrated approximately the same properties as the vulcanized materials from the standard mixtures and the two comparison mixtures V1 and V2. Higher stress values, a higher hardness, and a higher rebound resilience were produced with the vulcanized material from mixture E4, which would permit a reduction of the silane content.

TABLE 1

|  |  | standard | V 1 | V 2 | E 1 | E 2 | E 3 | E 4 |
|---|---|---|---|---|---|---|---|---|
| natural rubber | K % | 10 | 10 | 10 | 10 | 10 | 10 | 10 |
| S-SBR | K % | 55 | 55 | 55 | 55 | 55 | 55 | 55 |
| cis-BR | K % | 35 | 35 | 35 | 35 | 35 | 35 | 35 |
| activated carbon black | K % | 15 | 15 | 15 | 15 | 1S | 15 | 15 |
| salicic acid precipitated | K % | 70 | 70 | 70 | 70 | 70 | 70 | 70 |
| silane TESPT | K % | 2.5 | 2.5 | 2.5 | 2.5 | 2.5 | 2.5 | 2.5 |
| pentaerythrite tristearate | K % | 2 |  |  |  |  |  |  |
| polyethylene glycol 1500 | K % |  | 2 |  |  |  |  |  |
| glycerine | K % |  |  | 2 |  |  |  |  |
| glycerine monostearate | K % |  |  |  | 2 |  |  |  |
| sorbitane monostearate | K % |  |  |  |  | 2 |  |  |
| sorbitane mono-oleate | K % |  |  |  |  |  | 2 |  |
| trimethylolpropane | K % |  |  |  |  |  |  | 2 |
| aromatic oil | K % | 24 | 24 | 24 | 24 | 24 | 24 | 24 |
| zinc fatty acid soap | K % | 2 | 2 | 2 | 2 | 2 | 2 | 2 |
| stearic acid | K % | 1 | 1 | 1 | 1 | 1 | 1 | 1 |
| zinc white | K % | 2 | 2 | 2 | 2 | 2 | 2 | 2 |
| anti-oxidant agent | K % | 2.4 | 2.4 | 2.4 | 2.4 | 2.4 | 2.4 | 2.4 |
| light protection wax | K % | 2 | 2 | 2 | 2 | 2 | 2 | 2 |
| DPG | K % | 2 | 2 | 2 | 2 | 2 | 2 | 2 |
| CBS | K % | 1.5 | 1.5 | 1.5 | 1.5 | 1.5 | 1.5 | 1.5 |
| sulfur | K % | 1.5 | 1.5 | 1.5 | 1.5 | 1.5 | 1.5 | 1.5 |
| ML 1 + 3 100° C. |  | 118 | 114 | 108 | 99 | 100 | 104 | 90 |
| breaking strength | N/mm² | 15.4 | 16 | 15 | 15 | 14 | 14 | 16 |
| deformation at break | % | 726 | 708 | 630 | 721 | 715 | 689 | 626 |
| stress value at 100 | N/mm² | 1.7 | 1.8 | 2.1 | 1.6 | 1.6 | 1.6 | 2 |
| stress value at 300 | N/mm² | 5.4 | 6.2 | 6.8 | 5.2 | 5.1 | 5.3 | 6.7 |
| Shore hardness A - 10° C. | Shore | 73 | 74 | 75 | 73 | 72 | 71 | 75 |
| Shore hardness A RT | Shore | 64.4 | 63 | 67 | 64 | 63 | 64 | 68 |
| rebound resilience RT | % | 36 | 35 | 36 | 35 | 36 | 36 | 35 |
| Shore hardness A 70° C. | Shore | 60.2 | 61 | 65 | 61 | 60 | 60 | 65 |
| rebound resilience 70° C. | % | 44.9 | 45 | 47 | 46 | 45 | 45 | 48 |
| impact value 70° C. | N/mm² | 51.1 | 54 | 42 | 45 | 45 | 48 | 35 |
| after aging in 70° Lu | d | 14 | 14 | 14 | 14 | 14 | 14 | 14 |
| breaking strength | N/mm² | 15.9 | 16 | 15 | 16 | 15 | 15 | 14 |
| deformation at break | % | 581 | 575 | 431 | 605 | 592 | 568 | 443 |
| stress value at 100 | N/mm² | 2.5 | 2.7 | 3.1 | 2.4 | 2.4 | 2.4 | 3 |
| stress value at 300 | N/mm² | 8.1 | 8.8 | 9.9 | 7.8 | 7.7 | 7.9 | 9.7 |
| Shore hardness A RT | Shore | 70.9 | 71 | 74 | 70 | 70 | 70 | 73 |
| rebound resilience RT | % | 40.3 | 39 | 40 | 40 | 40 | 40 | 39 |
| Shore hardness A 70° C. | Shore | 68.3 | 69 | 71 | 68 | 69 | 68 | 71 |
| rebound resilience 70° | % | 47 | 47 | 51 | 49 | 49 | 49 | 52 |
| impact value 70° C. | N/mm² | 32.8 | 33 | 36 | 33 | 40 | 41 | 36 |
| compression set B 70° | % | 28 | 26 | 22 | 28 | 28 | 28 | 20 |

What is claimed is:

1. A rubber mixture comprising:
   at least one polymer that comprises a diene rubber;
   5 to 100 parts by weight finely distributed, precipitated silicic acid;
   0 to 80 parts by weight carbon black;
   0.5 to 20 parts by weight of at least one non-aromatic, viscosity-reducing substance, wherein the viscosity-reducing, non-aromatic substance consists of carbon, hydrogen, and oxygen and has a region with at least two hydroxyl groups that exist in the form of 1,2-diol or 1,3-diol, and has a region of at least two chemically bonded carbon atoms, wherein neither the two chemically bonded carbon atoms nor their chemically bonded neighboring carbon atoms are substituted with oxygen; and
   wherein all parts by weight are based on 100 parts by weight of rubber in the mixture.

2. The rubber mixture of claim 1, further comprising 0.2 to 10 parts by weight silane coupling agent.

3. The rubber mixture of claim 1, comprising 1 to 10 parts by weight of viscosity-reducing substance.

4. The rubber mixture of claim 1, wherein the oxygen atoms of the viscosity-reducing substance exist exclusively in hydroxyl groups.

5. The rubber mixture of claim 1, wherein the viscosity-reducing substance comprises at least one member selected from the group consisting of 1,2-pentanediol, 2-methyl-2-propyl-1,3-propanediol, 2-butyl-2-ethyl-1,3-propanediol, 2-sec-butyl-2-methyl-1,3-propanediol, and trimethylolpropane (2-ethyl-2-hydroxymethyl-1,3-propanediol).

6. The rubber mixture of claim 1, wherein in addition to the hydroxyl groups, the viscosity-reducing substance contains an additional oxygen functional group.

7. The rubber mixture of claim 6, wherein the additional oxygen functional group comprises at least one member selected from the group consisting of ester, ether, acetal, and ketal functional groups.

8. The rubber mixture of claim 6, wherein the additional oxygen functional group forms a bridge between the region with at least two hydroxyl groups that exist in the form of 1,2-diol or 1,3-diol, and a region with at least two chemically bonded carbon atoms, wherein neither the chemically bonded carbon atoms nor their chemically bonded neighboring carbon atoms are substituted with oxygen.

9. The rubber mixture of claim 8, wherein the region with at least two hydroxyl groups comprises a polyol selected from the group consisting of glycerine, trimethylolpropane, pentaerythrite, sugar alcohol, and vinyl alcohol with a molecular weight <600 g/mol.

10. The rubber mixture of claim 9, wherein the polyol comprises sugar alcohol, and wherein the sugar alcohol is selected from the group consisting of erythrite, xylite, sorbite, dulcite, mannite, and inosite.

11. The rubber mixture of claim 8, wherein the region with at least two hydroxyl groups includes polyols that contain at least one ether group.

12. The rubber mixture of claim 11, wherein the at least one ether group is selected from the group consisting of a poly-compound of glycerine, a poly-compound of pentaerythrite, a cyclical ether, a polyol which has a moderate ethoxylation, a sugar present in furan configuration, and a sugar present in pyran configuration.

13. The rubber mixture of claim 12, wherein the at least one ether group comprises poly-compound of glycerine, and wherein the poly-compound of glycerine is diglycerine.

14. The rubber mixture of claim 12, wherein the at least one ether group comprises poly-compound of pentaerythrite, and wherein the poly-compound of pentaerythrite is dipentaerythrite.

15. The rubber mixture of claim 12, wherein the at least one ether group comprises cyclical ether, and wherein the cyclical ether can be produced by removal of water from a sugar alcohol.

16. The rubber mixture of claim 15, wherein the cyclical ether comprises sorbitane derived from sorbite.

17. The rubber mixture of claim 12, wherein the at least one ether group comprises sugar present in furan configuration, and wherein the sugar present in furan configuration is saccharose.

18. The rubber mixture of claim 8, wherein the region with at least two hydroxyl groups is esterified with one or two fatty acid molecules via bridge oxygens.

19. The rubber mixture of claim 18, wherein the fatty acid is selected from the group consisting of octane acid, 2-ethylhexane acid, lauric acid, stearic acid, palmitic acid, oleic acid, linoleic acid, linolenic acid, ricinoleic acid, and a fatty acid component with alicyclic side chains.

20. The rubber mixture of claim 19, wherein the fatty acid comprises fatty acid component, and wherein the fatty acid component is a cyclopentenyl fatty acid.

21. The rubber mixture of claim 19, wherein the fatty acid comprises fatty acid component, and wherein the fatty acid component comprises a mixture of fatty acids.

22. The rubber mixture of claim 19, wherein the fatty acid comprises a mixture based on natural raw materials.

23. The rubber mixture of claim 22, wherein the natural raw materials are produced by splitting a fatty acid.

24. The rubber mixture of claim 23, wherein the fatty acid is selected from the group consisting of coconut oil acid, rapeseed oil acid, and soya oil acid.

25. The rubber mixture of claim 23, wherein the fatty acid comprises a fraction of a member selected from the group consisting of coconut oil acid, rapeseed oil acid, and soya oil acid.

26. The rubber mixture of claim 25, wherein the fraction comprises a low-molecular weight first-run acid.

27. The rubber mixture of claim 6, wherein the region of the viscosity-reducing substance containing at least two hydroxyl groups is etherified with an alcohol.

28. The rubber mixture of claim 27, wherein the region containing at least two hydroxyl groups comprises a sugar.

29. The rubber mixture of claim 27, wherein the alcohol comprises a fatty alcohol.

30. The rubber mixture of claim 6, wherein the region of the viscosity-reducing substance containing at least two hydroxyl groups is acetalized with an aldehyde.

31. The rubber mixture of claim 30, wherein the aldehyde is butyral, and wherein the region containing at least two hydroxyl groups is approximately 30% acetalized.

32. A tire with a tread that is comprised at least partially of a vulcanized rubber mixture comprising:

at least one polymer that comprises a diene rubber;

5 to 100 parts by weight finely distributed, precipitated silicic acid;

0 to 80 parts by weight carbon black;

0.5 to 20 parts by weight of at least one non-aromatic, viscosity-reducing substance, wherein the viscosity-reducing, non-aromatic substance consists of carbon, hydrogen, and oxygen and has a region with at least two hydroxyl groups that exist in the form of 1,2-diol or 1,3-diol, and has a region of at least two chemically bonded carbon atoms, wherein neither the two chemically bonded carbon atoms nor their chemically bonded neighboring carbon atoms are substituted with oxygen; and wherein all parts by weight are based on 100 parts by weight of rubber in the mixture.

* * * * *